(12) United States Patent
Stahlberg et al.

(10) Patent No.: US 8,811,143 B2
(45) Date of Patent: Aug. 19, 2014

(54) SOFTWARE BASED SPREAD SPECTRUM SIGNAL PROCESSING

(75) Inventors: Christian Stahlberg, Sollentuna (SE); Per-Ludvig Normark, Stockholm (SE)

(73) Assignee: NordNav Technologies AB, Lulea (SE)

( * ) Notice: Subject to any disclaimer, the term of this patent is extended or adjusted under 35 U.S.C. 154(b) by 645 days.

(21) Appl. No.: 12/939,072

(22) Filed: Nov. 3, 2010

(65) Prior Publication Data

US 2011/0128998 A1     Jun. 2, 2011

Related U.S. Application Data

(63) Continuation of application No. 11/378,663, filed on Mar. 17, 2006, now Pat. No. 7,848,217.

(30) Foreign Application Priority Data

May 11, 2005   (EP) ..................................... 05445029

(51) Int. Cl.
| | |
|---|---|
| *H04J 11/00* | (2006.01) |
| *H04B 1/7077* | (2011.01) |
| *H04B 1/707* | (2011.01) |
| *H04L 29/06* | (2006.01) |
| *H04B 1/7095* | (2011.01) |

(52) U.S. Cl.
CPC ...... *H04L 65/607* (2013.01); *H04B 2201/7071* (2013.01); *H04B 2201/70715* (2013.01); *H04B 1/7077* (2013.01); *H04B 1/707* (2013.01); *H04B 1/7095* (2013.01)
USPC ............ 370/207; 370/205; 370/206; 370/343

(58) Field of Classification Search
USPC ............ 379/387.01–397; 370/205, 206, 207, 370/342, 343; 375/142, 147, 150
See application file for complete search history.

(56) References Cited

U.S. PATENT DOCUMENTS

2004/0071200 A1* 4/2004 Betz et al. ..................... 375/152
2004/0141549 A1    7/2004 Abraham et al.

FOREIGN PATENT DOCUMENTS

WO    WO2004036238    4/2004

* cited by examiner

*Primary Examiner* — Duc Nguyen
*Assistant Examiner* — Yosef K Laekemariam
(74) *Attorney, Agent, or Firm* — Vorys, Sater, Seymour and Pease LLP; Vincent M DeLuca

(57) ABSTRACT

A digital processing unit for use in a spread spectrum signal receiver, the digital processing unit being adapted to receive an incoming stream of data samples and in response thereto produce a decoded signal, the digital processing unit comprising a correlation module adapted to correlate data blocks formed from the incoming stream of data samples with a local code replica segment to produce a first number of intermediate accumulation results and an aggregation module adapted to receive the first number of intermediate accumulation results and to combine the first number of consecutive ones of said intermediate accumulation results to form a target number of aggregated accumulation results, said target number being less than or equal to the first number.

13 Claims, 4 Drawing Sheets

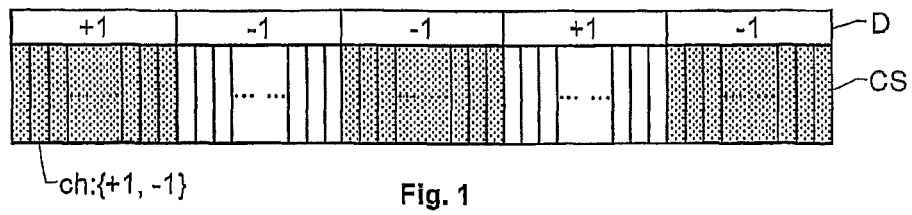
Fig. 1
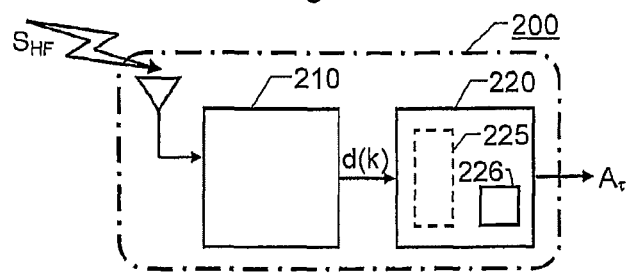
Fig. 2
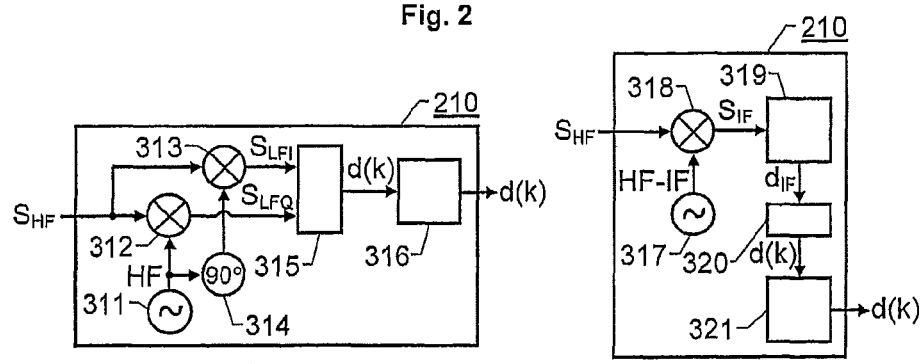
Fig. 3a
Fig. 3b
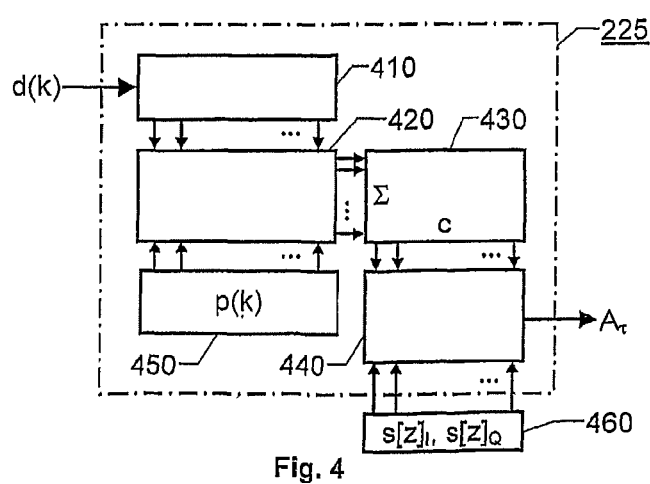
Fig. 4

SOFTWARE BASED SPREAD SPECTRUM SIGNAL PROCESSING

CROSS REFERENCE TO RELATED APPLICATIONS

This application is a continuation of U.S. application Ser. No. 11/378,663, filed Mar. 17, 2006, the entire contents of both are incorporated herein by reference.

THE BACKGROUND OF THE INVENTION AND PRIOR ART

The present invention relates generally to processing of spread spectrum signals by means of vector-based algorithms.

Spread spectrum transmission solutions are becoming increasingly important for instance in global navigation satellite systems (GNSS). Presently, the Global Positioning System (GPS; U.S. Government) is the dominating standard, however alternative standards exist and are expected to gain increased importance in the future. So far, the Galileo system (the European programme for global navigation services) and the Global Orbiting Navigation Satellite System (GLONASS; Russian Federation Ministry of Defense) constitute the alternative standards. Due to different signal formats and frequency bands of these standards a navigation receiver adapted for one GNSS, say GPS, is not able to receive and process signals from a satellite that belongs to a different GNSS, say the Galileo system.

In order to enable this type of system flexibility, a multi-mode receiver is required. However, including multiple receiver chains in a single device is not only expensive, it also renders the unit bulky and heavy, particularly if more than two signal formats are to be processed. Instead, a programmable software receiver solution is desired, wherein the signal processing principles may be altered according to which signals that presently shall be received and processed.

A software-based receiver is also desirable in cases where the GNSS receiver is intended to share a processing platform with other radio signal receivers and/or signal processing devices.

Various software solutions are already known for processing GNSS signals. The patent document WO2004/036238 describes a spread spectrum signal processing solution according to which data words are formed containing one or more consecutive sample values based on received spread spectrum signals. The data words are then correlated with pre-generated code vectors to produce resulting decoded data in a processing-efficient manner.

Akos. D. et al., "Tuning In to GPS—Real-Time Software Radio Architectures for GPS Receivers", GPS World, July 2001 describes a receiver architecture through which IF signal samples are fed directly from a radio front-end to a programmable processor for continued processing. The article mentions the possibility of using single instruction multiple data (SIMD) instructions to process-multiple data samples in parallel.

Dovis, F. et al., "Design and Test-Bed Implementation of a Re-configurable Receiver for Navigation Applications", Electronics Department, Politecnico di Torino, Navigation Signal Analysis and Simulation Group, Spring of 2002 relates to the design of a reconfigurable GNSS receiver which is capable of fusing data from two or more different GNSS:s. The document sketches an architecture which, in addition to a radio front-end, includes a Field Programmable Gate Array (FPGA) and a Digital Signal Processor (DSP).

Hence, the prior art includes various examples of software based GNSS receivers. Nevertheless, in order to meet the growing mass market's demands in terms of high flexibility, low cost and upgradeability software receivers are desired that have even further enhanced power efficiency. Namely, in order to be included in a platform of a handheld device, such as a mobile phone or a Personal Digital Assistant (PDA), the processing load caused by the GNSS receiver's software baseband engine should be as low as possible (i.e. a low MIPS requirement must be fulfilled; MIPS—millions of/or Mega Instructions Per Second) because a low power consumption enables implementation in weaker microprocessor systems and/or co-existence with other processing intensive applications running on the same platform.

Moreover, the time-critical memory requirement should be minimized, since the mass-market embedded platforms are generally weak in terms of bus bandwidth, cache sizes and memory latencies (i.e. read/write stalls). In a software baseband receiver a trade-off can normally be made between memory usage and MIPS usage (i.e. between what is pre-computed and stored in tables and vectors and what is generated on the fly). Consequently, in order to be optimal, a software baseband solution should be well adapted to the microprocessor architecture both with respect to algorithm design and implementation, i.e. use as few operations as possible with an optimized memory usage and access.

A GNSS receiver performing a continuous tracking procedure (e.g. required for in-car navigation) must be capable of processing a high-bandwidth data stream in real-time. The software solutions currently available for real-time tracking in embedded architectures are predominantly single-bit oper- and solutions. Here, the Doppler shift removal and correlation operations must be executed with operands restricted to single bit binary values in order to lower the internal data stream bandwidths and processing load. This imposes a significant sensitivity loss (up to 6 dB). Furthermore, in a typical use case (e.g. inside a car), the navigation device is often placed such that there is no direct line of sight between the receiving antenna and the satellites. This causes additional signal power degradation by 6-10 dB.

We will now discuss the relationship between the digital baseband processing approach used and the resulting quality of the decoded signal. Assuming that the antenna is of good quality, the radio frequency conditioning unit (i.e. the analog part of the receiver block that demodulates and samples the signal) is provided with a low-noise amplifier (LNA) of high quality, has a sufficiently large analog bandwidth (and sampling frequency) and the local oscillator driving the front-end has an adequate frequency stability, the digital baseband processing essentially determines the receiver's total noise-figure.

Further, if circumstances external to the receiver, such as interference, multi-path fading and signal obscuration are disregarded, any signal power loss is caused by optimizations in the quantizing of correlation operands, the quantizing of the tracking error in the time delay of code replicas and the frequency error in the Doppler estimation.

Generally, a spread spectrum receiver may compensate for a weak (low power) signal by performing longer coherent and non-coherent correlation operations. Namely, this averages out a larger amount of noise (by the summing performed in correlation) and hence renders the signal more easily detectable. By prolonging the integration time (e.g. the time spent on correlation before investigating the correlation result) any loop filters used for tracking the code and carrier frequency and phase will be updated less frequently. This generally degrades the performance and stability of these filters, especially in terms of dynamic performance.

The tracking loops aim at matching the incoming signal with respect to code, carrier frequency and phase. This matching is performed by repeatedly adjusting the frequency of the locally generated replica code and carrier Doppler shift. As soon as the relevant discriminators (error functions) indicate no (or a sufficiently low) difference between incoming signal and a locally produced signal, the incoming signal and local replica are considered to be aligned. At this point, the receiver has a best possible estimate of carrier Doppler shift and code start (the parameters used for position, velocity and time computations, as well as for determining a strongest possible signal power retrieved from the correlation process).

In order to enable decoding of a GNSS signal, the timing error for the replica code must be within ±1 chip, so that any detectable signal power can be produced. If multi-path effects and cross-correlation effects are considered, a lower timing error is typically required.

To determine the carrier Doppler shift, the frequency error must be less than the inverse of the integration time. Otherwise, any resulting Doppler shift cancels out the correlation gain.

The PRN codes used for spreading and despreading are only two valued (+1, −1). Therefore, these codes may be represented with binary values without any correlation loss. As for the sampled incoming data, a single bit value representation works, which gives the CDMA systems in general (and GNSS:s in particular) a remarkable robustness. Even though each sample mostly contains noise (or undesired signal energy) an adequate correlation process is still able restore the signal.

An increase from 1-bit data to 2-bit results in a C/No (carrier-to-noise, bandwidth independent signal power metric) gain of about 2.5 dB-Hz, and an increase from 2-bit representation to 4-bit representation accomplishes another 1 dB-Hz gain. However, further increases of the number of bits only provide insignificant quality enhancements, and are therefore not justified in commercial applications.

As for the carrier Doppler frequency compensation, the sinusoid amplitude values are usually quantized with 1- to 5-bit values, depending on the quality of the receiver. Use of single bit values instead of a 3-bit representation results in a signal power loss of about 2 dB-Hz. A single bit representation is also unfavorable because it introduces unwanted signal properties. Namely, the 1-bit quantized sinusoid is actually a square-wave, which is relatively remote from the carrier waveform used the transmitter side (i.e. in the satellites). The transmitter normally modulates a carrier wave by means of phase shift keying, such as Binary Phase Shift Keying (BPSK).

Nevertheless, since the single bit representation allows for the least complex hardware implementation this is the standard approach in low-end GNSS receivers. More advanced (and expensive) receivers often use multi-bit data and multi-bit carrier Doppler representations.

When it comes to software baseband implementation the least complex implementation usually coincides with the executing least-addressable-unit (LAU) that is supported by the microprocessor system architecture. Usually, the LAU is 8-bit or 16-bit valued (byte or half word/word registers). Moreover, high-performance instructions, such as single cycle MACs (multiply-accumulate) in digital signal processors (DSP:s) or dedicated SIMD instructions tend to use LAU operands as input.

Today's most MIPS-efficient implementations of software base-band solutions use XOR instructions with 1-bit operands. This can be explained by the fact that most modern microprocessor architectures support 32-bit XOR instructions, which in turn enables 32 parallel multiplications of 1-bit operands in one instruction. This is possible because the product of a 1-bit by 1-bit multiplication does never expands outside one bit. The XOR operation simply updates the sign.

The MIPS requirement for a continuous tracking GNSS software receiver is almost entirely determined by the performance of the carrier Doppler removal and replica code correlation. The reason behind this is that the baseband processing is performed on a sample basis (i.e. in the MHz-domain), whereas the tracking loops updates, the navigation data decoding and the position computations are carried out at a higher system level (i.e. in the kHz- and Hz-domain respectively). Therefore, the latter signal processing is less time critical.

In the light of this, the baseband algorithm design and its implementation are of vital importance to the performance of the software receiver. Thus, using XOR instructions is simply not sufficient to achieve a good processing efficiency.

Instead, the efficiency of following operations/steps also determine the overall performance: load sampled signal data; loading/generation of local I/Q Doppler operands; multiplication of data with Doppler operands to compensate for a carrier Doppler shift; loading/generation of local replica PRN code operands; multiplication of baseband data with replica operands; accumulation of individual results for producing correlation outputs; and storing of results.

In order to attain a basic implementation efficiency, the operands should be vectorized and pre-computed as much as possible given a reasonable trade-off between desired accuracy and memory requirements, for example as is proposed in the international Patent Application WO2004/036238.

The generalized baseband processing can be described by complex vector operations, using in-phase (I) and quadrature-phase (Q) notation, as:

$$A_\tau = \sum_{k=0}^{L-1} [(d_I[k] + j \cdot d_Q[k]) \cdot (s_I[k] + j \cdot s_Q[k])] \cdot p_\tau[k] \qquad (1)$$

where
L is the vector length (typically one code epoch in samples),
d[k] is a complex sampled data vector,
$s_I[k]$ is an in-phase part of a complex carrier Doppler vector,
$s_Q[k]$ is a quadrature-phase part of a complex carrier Doppler vector,
$p_\tau[k]$ is a τ-delayed real-valued local PRN code replica, and
$A_\tau$ is a complex correlation result with respect to a delay given by τ.

The most common number of replica delays, τ, is three; denoted, early $A_E$ (τ=E), prompt $A_p$ (τ=P), and late $A_L$ (τ=L). Provided that three delays are used, in total six accumulator values will be produced (i.e. three complex accumulators). Alternatively, a combined early-minus-late approach may be used, which produces a total of four accumulator values $(A_{p,I}, A_{P,Q}, A_{E-L,I}$ and $A_{E-L,Q})$.

Preferably, for different delays, τ, the baseband version of the sampled data is preferably reused between different delays.

The equation (1) is valid both for I/Q-sampling and IF-sampling. In the latter case, d[k] is real-valued (i.e. all $d_Q[k]$ values are zero), and s[k] also includes the IF frequency in addition to the Doppler shift.

Assuming that the operands are vectorized, pre-computed and rapidly accessible from memory, a straight-forward baseband processing results in the following pseudo code complexity for computing the accumulator values for three replica delays of a single sample value d[k] (represented by $d_I[k]$ and $d_Q[k]$ respectively in complex notation):

```
for (k=0:L-1)
{
B_I=d_I[k].s_I[k]-d_Q[k] s_Q[k]
b_Q=d_I[k].s_Q[k]+d_Q[k] s_I[k]
A_E,I= A_E,I+b_I.p_E[k]
A_E,Q= A_E,Q+b_Q.p_E[k]
A_P,I= A_P,I+b_I.p_P[k]
A_P,Q= A_P,Q+b_Q.p_P[k]
A_L,I= A_L,I+b_I.p_L[k]
A_L,Q= A_L,Q+b_Q.p_L[k]
}
```

Hence, in addition to unavoidable load and store operations 10 multiplications and 8 additions are required. The processing of a single code epoch (1 millisecond) of a GPS C/A signal using I/Q sampling would require an L-value of approximately 2000. Assuming in total 25 instructions (serial LAU processing) per sample value gives roughly 50000 instructions per channel and millisecond, i.e. a processing load of 50 MIPS. Thus, an implementation wherein all vector operands are pre-generated, a fully parallel twelve-channel software receiver would cause a processing load of approximately 600 MIPS. If, instead, IF sampling were employed fewer instructions per pass would be required. In this case, however, the L-value must be doubled (i.e. around 4000), which results in an equivalent overall processing load. Naturally, such a MIPS-requirement is unsuitable for today's handheld devices.

By dividing the L sample values representing a code epoch into smaller blocks, SIMD instructions may be applied to these blocks and several passes can be computed in parallel. Furthermore, if single-bit data is used it is possible to lower the processing burden down to less than 10 MIPS per channel by applying XOR operations and summation look-up tables (LUT).

However, to achieve such performance with acceptable accuracy the receiver must have access to a relatively large memory means having a high bandwidth and low latency. Namely, as mentioned initially, the parameters: memory usage, MIPS and accuracy can all be traded against one other depending on the application and target architecture.

Increasing the number of bits used for estimating the carrier Doppler shift and/or digitizing the incoming data stream may attain an improved sensitivity in the baseband processing. Nevertheless, this causes a performance loss in the above-mentioned packed processing SIMD approach, since the microprocessor register widths are fixed and fewer samples can then be computed in parallel per pass with XOR operations. If both carrier Doppler shift estimation and the incoming data stream are multi-bit valued the processing becomes very complex, and difficult to perform efficiently because the representation of the intermediate products will inevitably expand.

For 2-bit valued data and carrier Doppler shift estimation a decent implementation can be designed by using sign and magnitude representation and a separate processing of these parts. However, also in this case the performance penalty compared to single-bit processing is still considerable. In implementations with more than 2 bits per data value the additional logic operations required for combining individual sign and magnitude parts becomes a serious bottleneck.

SUMMARY OF THE INVENTION

According to one embodiment of the invention, there is provided a digital processing unit for use in a spread spectrum signal receiver, the digital processing unit being adapted to receive an incoming stream of data samples and in response thereto produce a decoded signal, the digital processing unit comprising a correlation module adapted to correlate data blocks formed from the incoming stream of data samples with a local code replica segment to produce a first number of intermediate accumulation results and an aggregation module adapted to receive the first number of intermediate accumulation results and to combine the first number of consecutive ones of said intermediate accumulation results to form a target number of aggregated accumulation results, said target number being less than or equal to the first number.

The aggregation module may be adapted to form the target number of aggregated accumulation results in dependence on a Doppler shift expressed by a carrier vector.

The aggregation module may be adapted to form the target number of aggregated accumulation results such that a relatively low Doppler shift is associated with a comparatively low target number and a relatively high Doppler shift is associated with a relatively high target number.

The digital processing unit may comprise a second correlation module adapted to correlate the aggregated accumulation results with the carrier vector to produce a decoded signal that is compensated for the Doppler shift.

The aggregation module may be arranged to form the target number of aggregated accumulation results to be equal to a number of discrete carrier values in the carrier vector.

The digital processing unit may further comprise a partitioning module adapted to receive a downconverted digitised spread spectrum source signal and to divide that signal into a number of data blocks equal to the first number, each data block containing a second number of samples, the second number being an integer larger than or equal to two, and to output the first number of data blocks to the first correlation module.

The partitioning module may be adapted to form the data blocks to be expressed as packed operands, and the first correlation module is adapted to multiply the data blocks with local code replica segments that are also expressed as packed operands by executing binary logical instructions.

The first correlation module may be adapted to perform a summation operation in respect of at least one multiplication result obtained by means of the binary logical instructions by using a summation look-up table.

The first correlation module may be adapted to generate the accumulation results to be expressed as non-packed operands and/or the aggregation unit is adapted to generate the aggregated accumulation results to be expressed as non-packed operands.

The second correlation module may be adapted to correlate the aggregated accumulation results with carrier values that are expressed as non-packed operands by executing least-addressable unit operations.

The second correlation module may be adapted to correlate the aggregated accumulation results with carrier values that are expressed in a multiple-bit format.

The digital processing unit may be adapted to store a compressed vector table comprising a plurality of pre-generated carrier vectors.

The plurality of pre-generated carrier vectors may be run-length encoded, the digital processing unit being capable of generating a carrier vector comprising a number of discrete carrier values from said run-length encoded vectors by means of a run-length decoding algorithm.

According to another embodiment of the invention, there is provided a method for receiving an incoming stream of data samples and in response thereto producing a decoded signal, comprising correlating data blocks formed from the incoming stream of data samples with a local code replica segment to produce a first number of intermediate accumulation results and combining the first number of consecutive ones of said intermediate accumulation results to form a target number of aggregated accumulation results for outputting to a second correlation module, said target number being less than or equal to the first number.

According to another embodiment of the invention, there is provided an aggregation module for use in a spread spectrum signal receiver, the aggregation module being adapted to receive a first number of accumulation results from a first correlation module, said accumulation results representing the correlation between an incoming stream of data samples and a local code replica segment, and to combine the first number of consecutive ones of said accumulation results to form a target number of aggregated accumulation results for outputting to a second correlation module, said target number being less than or equal to the first number, the aggregation module thereby being capable of adapting the accumulation results from the first correlation module to a number of discrete carrier values in a carrier vector with which the aggregated accumulation results are to be correlated by the second correlation module.

The object of the present invention is therefore to provide a software based solution for processing spread spectrum signals having a reduced implementation loss, which solves the problems above and thus presents a strategy that increases the sensitivity at the lowest level of operation while maintaining low processing requirements and memory usage.

According to one aspect of the invention the object is achieved by the software correlator as initially described, wherein the correlator includes a partitioning module, a first correlation module, an aggregation module and a second correlation module. The partitioning module is adapted to divide a number of the received data samples into a first number of data blocks. Here, each data block contains a second number of samples, where the second number is an integer larger than or equal to two. The first correlation module is adapted to correlate each of the data blocks with a respective local code replica segment to produce a first number of intermediate accumulation results. The aggregation module is adapted to combine a number of consecutive results of the intermediate accumulation results into a target number of aggregated accumulation results. The target number expresses a number of discrete carrier values in a carrier vector that represents a Doppler shift of the at least one spread spectrum source signal relative to a downconverting frequency for this signal. The target number is smaller than or equal to the first number. The second correlation module is adapted to correlate the aggregated accumulation results with the carrier vector to produce the decoded signal, which is compensated for the Doppler shift relative to the downconverting frequency.

This correlator is advantageous because it presents a dramatically simplified arithmetic. It also benefits maximally from any quantizing effects of the Doppler shift compensation and enables multi-bit operands, which vouches for a very beneficial memory usage-to-MIPS usage relationship.

According to a preferred embodiment of this aspect of the invention, the software correlator includes a code storage means that stores the local code replicas constituting the basis for the local code replica segments. Moreover, the first correlation module is adapted to receive the local code replica segments from the storage means. Thus, appropriate pre-generated code replica segments can be used. This highly decreases the computational load at a relatively low memory cost.

According to another preferred embodiment of this aspect of the invention, the software correlator is associated with a vector storage means that stores a compressed vector table (i.e. the correlator either includes or by other means has access to the table), The compressed vector table includes a plurality of pre-generated digitized carrier vectors, where each carrier vector contains a set of carrier values. The second correlation module is adapted to receive the carrier values from the storage means. Thereby, the correlator may efficiently produce the decoded signal.

According to yet another preferred embodiment of this aspect of the invention, each of the pre-generated carrier vectors in the vector storage means is a complex valued vector that expresses in-phase and quadrature-phase carrier values respectively. Namely, thereby the carrier vectors may readily be correlated with the aggregated accumulation results.

According to a further preferred embodiment of this aspect of the invention, the vectors in the vector storage means are run-length encoded (i.e. express a number of repetitions of each carrier value instead of including this number of repeated values). Moreover, the correlator is adapted to handle this type of compressed vectors by determining the applicable carrier values based on a run-length decoding algorithm. Naturally, this design is desirable because thereby the efficiency of the baseband processing is further improved.

According to another preferred embodiment of this aspect of the invention, each of the data blocks is expressed as a first type of packed operand and each of the local code replica segments is expressed as a second type of packed operand. The first correlation module is then adapted to multiply the data blocks with the local code replica segments by executing binary logical instructions (or SIMD instructions) in respect of the first and second types of operands. Hence, a highly efficient parallel processing is performed without a result expansion outside the size of the operands.

According to still another preferred embodiment of this aspect of the invention, the first correlation module, is adapted to perform at least one summation operation in respect of at least one multiplication result obtained by means of the binary logical instructions based on at least one summation look-up table. Namely, this lowers the processing burden, and thus enables a relatively high operation speed.

According to a further preferred embodiment of this aspect of the invention, each of the aggregated accumulation results is a first type of non-packed operand and each of the carrier values is a second type of non-packed operand. Moreover, the second correlation module is adapted to multiply the aggregated accumulation results with the carrier values by LAU operations in respect of the first and second types of non-packed operands. Thereby, an implementation in a microprocessor system is facilitated, and high-performance instructions, such as single cycle multiply-accumulate instructions in digital signal processors, or dedicated SIMD instructions may be used.

According to another aspect of the invention the object is achieved by the initially described spread spectrum receiver, wherein the digital processing unit includes the above-proposed software correlator. Naturally, such a receiver is advantageous for the same reasons as the correlator itself.

According to a preferred embodiment of this aspect of the invention, the data interface unit includes a buffer unit. This unit is adapted to buffer the data samples in the stream of data samples; and deliver a formatted stream of data samples to the digital processing unit. The formatted stream of data samples is here adapted to a data format suitable for the digital processing unit. Hence, enabling the software correlator of the digital processing unit to conveniently receive data samples forms the basis for an efficient processing.

According to another preferred embodiment of this aspect of the invention; the data interface unit includes a downconverting section and a digitizing section. The downconverting section is adapted to receive the spread spectrum source signals, and in response thereto produce a pair of frequency downconverted signals representing in-phase data and quadrature-phase data respectively. The digitizing section is adapted to receive the pair of frequency downconverted signals, and in response thereto produce the stream of data samples. The data interface unit thereby directly delivers data samples of an I/Q format to the buffer unit.

According to another preferred embodiment of this aspect of the invention, the data interface unit instead includes a primary downconverting section, a digitizing section and a secondary downconverting section. The primary downconverting section is adapted to receive the at least one spread spectrum source signal, and in response thereto produce a downconverted signal. The digitizing section is adapted to receive the frequency down-converted signal, and in response thereto produce a primary stream of data samples equivalent to a relatively high frequency. The secondary downconverting section is adapted to receive the primary stream of data samples, digitally multiply the data samples of this stream of with an in-phase and a quadrature-phase carrier wave respectively, and filter and resample a result thereof to produce the stream of data samples. Hence, the data samples are delivered to the buffer unit at an I/Q format, however in this case they have been generated according to a different procedure. This procedure is advantageous in relation to the former in that it only requires one analog mixing. However, it involves more digital processing.

According to another aspect of the invention the object is achieved by the initially described method, wherein the method includes the following steps. First, a number of the received data samples are divided into a first number of data blocks. Each data block here contains a second number of samples, which is an integer larger than or equal to two. Second, each of the data blocks is correlated with a respective local code replica segment to produce a first number of intermediate accumulation results. A target number is defined, which represents the number of discrete carrier value levels included in a relevant carrier vector (i.e. the vector with which the accumulation results are to be correlated). The target number is smaller than or equal to the first number. Thus, depending on the relationship between the first number and the target number, the method also involves combining a number of consecutive results of the intermediate accumulation results into a number of aggregated accumulation results that is equal to the target number. Third, the aggregated accumulation results are correlated with the relevant carrier vector, i.e. a vector containing the target number of carrier values. As a result, a decoded signal value is produced, which has been compensated for a Doppler shift relative to a downconverting frequency for the least one spread spectrum source signal. Namely, the above-mentioned carrier vector expresses this Doppler shift.

Important advantages of this method are that the arithmetic operations can be made very simple, and at the same time the method benefits maximally from any quantizing effects of the Doppler shift compensation and enables a multi-bit operands. Further advantages, advantageous features and applications of the method according to the invention will be apparent from the following description and the dependent claims.

According to an additional aspect of the invention the object is achieved by a computer program directly loadable into the internal memory of a computer, comprising software for performing the above proposed method when the program is run on a computer.

According to another aspect of the invention the object is achieved by a computer readable medium, having a program recorded thereon, where the program is to make a computer perform the above proposed method.

Generally, the present invention is advantageous in that it radically reduces the number of operations required to perform the baseband processing in relation to the prior-art software-based solutions for real-time processing of spread spectrum signals.

Moreover, the proposed processing strategy lowers the memory requirements, enables multi-bit operands (i.e. for sampled data and carrier Doppler values), and maps efficiently to a generic microprocessor architecture.

BRIEF DESCRIPTION OF THE DRAWINGS

The present invention is now to be explained more closely by means of preferred embodiments, which are disclosed as examples, and with reference to the attached drawings.

FIG. 1 illustrates how a data signal is modulated onto a signal source specific code sequence according to one embodiment of the invention, FIG. 2 shows a block diagram over a spread spectrum signal receiver according to one embodiment of the invention, FIGS. 3a-b show block diagrams over data interface units according embodiments of the invention, FIG. 4 shows a block diagram over a software correlator according to one embodiment of the invention, FIG. 5 schematically illustrates how a decoded signal is produced based on an incoming stream of data samples according to one embodiment of the invention, FIGS. 6a-e schematically illustrate how a compressed vector table including a plurality of pre-generated digitized carrier vectors may be expressed according to embodiments of the invention.

Figure 5:
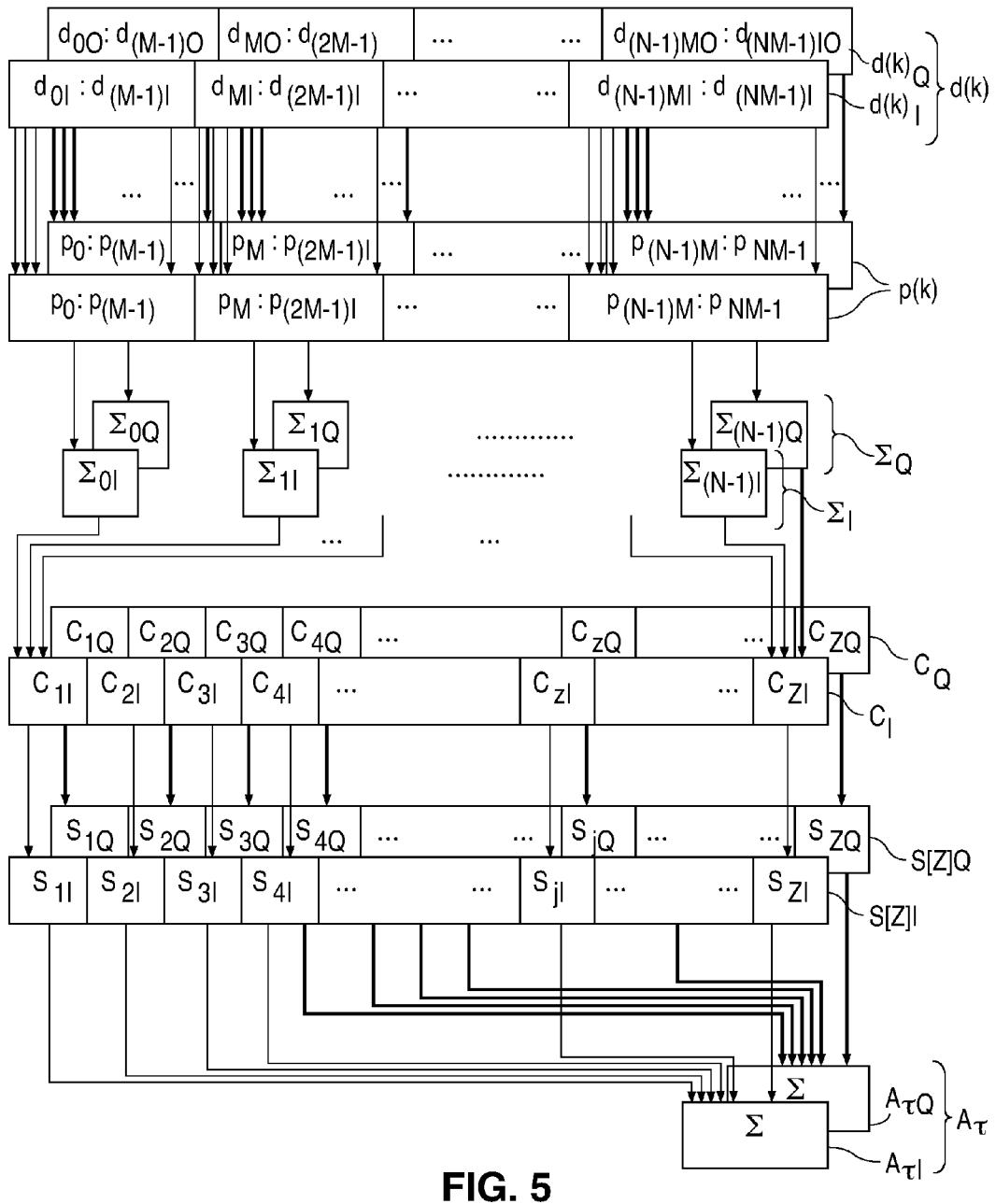

DESCRIPTION OF PREFERRED
EMBODIMENTS OF THE INVENTION

Before describing the invention as such, we turn briefly to FIG. 1, in order to explain how a data signal D may be modulated onto a signal source specific code sequence CS on the transmitter side. For instance, the signal source specific code sequence CS may a PRN code. The data signal D here contains a data symbol sequence [+1, −1, −1, +1, −1], and has a relatively low symbol rate, say 50 Hz. The signal source specific code sequence CS, however, has a relatively high symbol rate (or more correctly chipping rate). For instance, a signal source specific code sequence CS in the form of a GPS C/A code may have a chipping rate of 1,023 MHz and contain 1023 chips per period. Each chip, ch, is either +1 or −1. Hence, the C/A code repeats itself one per ms. The data signal D is modulated onto (or spread by) the signal source specific code sequence CS by multiplying each data symbol with the code sequence CS. The data symbol +1 thereby results in an unaltered code sequence CS, whereas the data symbol −1 results in an inverted code sequence CS.

If a data signal D having a rate of 50 Hz is spread by means of a signal source specific code sequence CS having a chipping rate of 1,023 MHz, this results in 20 entire code sequences CS per data symbol. Namely, the period time for one data symbol is 20 ms, whereas the period time for the code sequence is only 1 ms.

FIG. 2 shows a block diagram over a spread spectrum signal receiver 200 according to one embodiment of the invention. The receiver 200 includes a data interface unit 210 and a digital processing unit 220. The data interface unit receives spread spectrum source signals SHF, and in response thereto produces a stream of data samples d(k). The processing unit 220 receives the stream of data samples d(k), and in response thereto produces a decoded signal $A_r$. The processing unit 220 implements a software correlator 225, which will be described in detail below with reference to FIGS. 4, 5 and 7. Preferably, the processing unit 220 includes a computer readable medium 226 in which a program is stored that is adapted to control the software correlator 225 to perform the proposed processing steps, such that the decoded signal $A_r$ is produced.

FIG. 3a shows a block diagram over the data interface unit 210 according a first embodiment of the invention. Here, the data interface unit 210 includes a downconverting section, a digitizing section 315 and a buffer unit 316.

The downconverting section is adapted to receive the spread spectrum source signal $S_{HF}$, and in response thereto produce a pair of frequency downconverted signals representing in-phase data $S_{LR}$ and quadrature-phase data $S_{LFQ}$ respectively. To this aim, the downconverting section may include an oscillator 311, a first mixing means 312, a second mixing means 313 and a phase shifting means 314.

The oscillator 311 generates a sinusoid signal of a frequency HF which is essentially the same as that of the spread spectrum source signal $S_{HF}$ (i.e. a relatively high frequency). The oscillator frequency HF is fed both to the first mixing means 312 and the phase shifting means 314. The first mixing means 312 also receives the spread spectrum source signal $S_{HF}$, and as a result of a mixing process accomplished by the first mixing means 312, an in-phase frequency downconverted signal $S_{LR}$ is produced.

The phase shifting means 314 adds a 90°-phase shift to the oscillator frequency HF and forwards this signal to the second mixing means 313. The second mixing means 313 also receives the spread spectrum source signal $S_{HF}$, and as a result of a mixing process accomplished by the second mixing means 313, a quadrature-phase frequency downconverted signal $S_{LFQ}$ is produced.

The digitizing section 315 receives the frequency downconverted signals $S_{LFI}$ and $S_{LFQ}$ respectively, and in response thereto produces the stream of data samples d(k), i.e. a digital equivalence to the frequency downconverted signals $S_{LFI}$ and $S_{LFQ}$.

The buffer unit 316, in turn, receives the data samples d(k) and buffers these samples before delivering them to the digital processing unit 220. Preferably, the buffer unit 316 also formats the data samples d(k) to a format adapted to a data format of the digital processing unit 220.

FIG. 3b shows a block diagram over the data interface unit 210 according a second embodiment of the invention. In this case, the data interface unit 210 includes a primary downconverting section, a digitizing section 319, a secondary downconverting section 320 and a buffer unit 321.

The primary downconverting section is adapted to receive the spread spectrum source signal $S_{HF}$, and in response thereto produce a downconverted signal $S_{IF}$. To this aim, the primary downconverting section may include an oscillator 317 and a mixing means 318. The oscillator 317 generates a frequency HF-IF, which is slightly lower than in the embodiment described above with reference to the FIG. 3a, however still a comparatively high frequency. The oscillator frequency HF-IF is fed to the mixing means 317. The mixing means 317 also receives the spread spectrum source signal $S_{HF}$, and as a result of a mixing process accomplished by the mixing means 317, a frequency downconverted signal $S_{IF}$ is produced.

The digitizing section 319 receives the frequency downconverted signal $S_{IF}$, and in response thereto produces a primary stream of data samples $d_{IF}$, representing a relatively high signal frequency.

The secondary downconverting section 320 receives the primary stream of data samples dip, and in response thereto produces the stream of data samples d(k) (i.e. I/Q-sample values representing a relatively low signal frequency). Specifically, the section 320 multiplies the primary stream of data samples $d_{IF}$ digitally with a respective in-phase and quadrature-phase carrier wave. Then, the resulting digital signals are filtered and resampled down to produce the stream of data samples d(k).

The buffer unit 321 receives the data samples d(k) and buffers these samples before delivering them to the digital processing unit 220. Preferably, the buffer unit 321 also formats the data samples d(k) to a format adapted to a data format of the digital processing unit 220.

If a higher resolution than a single-bit representation is desired for the carrier values, this design requires LAU representation and operations. Hence, in such a case it may be necessary to initially unpack the sample, and once the conversion is made pack them together again. Naturally, this introduces a performance penalty. However, depending on the implementation efficiency and the fact that the overhead is shared for all channels it may still be a viable option.

FIG. 4 shows a block diagram over the software correlator 225 of the FIG. 2 according to one embodiment of the invention. Hence, the correlator 225 receives an incoming stream of data samples d(k) that represent at least one downconverted digitized spread spectrum source signal $S_{HF}$, and in response thereto the correlator 225 produces a decoded signal $A_r$.

The correlator 225 includes a partitioning module 410, a first correlation module 420, an aggregation module 430 and a second correlation module 440.

The partitioning module 410 is adapted to divide a number of the received data samples d(k) into a first number N of equally large data blocks. Consequently, each data block contains a second number M of samples. Of course, the second number M is an integer, and according to the invention, M is larger than or equal to two. Further aspects of this blocking of the received data samples d(k) will be discussed below with reference to FIG. 5.

The first correlation module 420 is adapted to correlate each of the data blocks produced by the partitioning module 410 with a respective local code replica segments p(k). The result of this correlation is a first number of intermediate accumulation results Σ, which are delivered on an output of the first correlation module 420.

According to one embodiment of the invention, each of the data blocks is expressed as a first type of packed operand, and each of the local code replica segments p(k), is expressed as a second type of packed operand. Then, the module 420 multiplies the data blocks with the local code replica segments p(k) by executing binary logical instructions (or SIMD instructions) in respect of the first and second types of operands.

Moreover, the module 420 is preferably adapted to perform summation operations in respect the multiplication results obtained by means of the binary logical instructions based on the contents of at least one summation look-up table.

According to another embodiment of the invention, the correlator 225 includes a code storage means 450 storing a plurality of local code replicas, which constitute the basis for the local code replica segments p(k). Thereby, the first correlation module 420 may retrieve relevant local code replica segments p(k) from this storage means 450.

The aggregation module 430 is adapted to combine a number of consecutive results of the intermediate accumulation results $\Sigma$ into a target number of aggregated accumulation results c. The purpose of the aggregation module 430 is to adapt the output from the first correlation module 420 to a number of different elements in a relevant carrier vector (containing discrete carrier values) with which the second correlation module 440 is to correlate the output from the first correlation module 420 (i.e. essentially the intermediate accumulation results $\Sigma$) in order to compensate for a particular Doppler shift of the spread spectrum source signal $S_{HF}$ relative to a downconverting frequency for this signal (i.e. HF or HF-IF above). The target number here expresses the number of discrete carrier values in the carrier vector that represents this Doppler shift. Generally, the target number of discrete carrier value levels represented by the carrier values depends on the magnitude of Doppler shift being expressed by the carrier vector. This means that a relatively low Doppler shift is associated with a comparatively low target number (i.e. few discrete carrier values), and a relatively high Doppler shift is associated with a comparatively high target number (i.e. many discrete carrier values).

According to the invention, the target number is smaller than or equal to the first number. Of course, if the target number is equal to the first number (i.e. equivalent to a theoretically highest possible Doppler shift compensation), the aggregation module 430 performs a trivial task, since the intermediate accumulation results $\Sigma$ then become identical to the aggregated accumulation results c.

The second correlation module 440 is adapted to correlate the aggregated accumulation results c with a carrier vector $s[z]_I$; $s[z]_Q$ containing I/Q carrier values, and as a result produce a decoded signal value $A_\tau$, which is compensated for the Doppler shift relative to the downconverting frequency that is defined by the carrier vector $s[z]_I$; $s[z]_Q$.

According to one embodiment of the invention, each of the aggregated accumulation results c is represented as a first type of non-packed operand, and each of the carrier vectors $s[z]_I$, $s[z]_Q$ is represented as a second type of non-packed operand. The second correlation module 440 is further adapted to multiply the aggregated accumulation results c with the carrier values of the carrier vectors $s[z]$, $s[z]_Q$ by executing LAU-operations in respect of the first and second types of non-packed operands.

According to another embodiment of the invention, the correlator 225 is associated with (i.e. either includes, or by other means has access to) a vector storage means 460, which store a compressed vector table containing a plurality of pre-generated digitized carrier vectors $s[z]_I$, $s[z]_Q$. Thereby, the second correlation module 440 may easily retrieve relevant carrier values from the storage means 460. The compressed vector table will be discussed in detail below with reference to the FIGS. 6a to 6e.

As mentioned above, the carrier vectors $s[z]_I$, $s[z]_Q$ used to compensate for a Doppler shift in the incoming stream of data samples d(k) is quantized, i.e. may attain a limited number of discrete amplitude values. The difference between using 1-bit carrier values and 5-bit carrier values can be as large 3 dB-Hz in measured C/No.

According to a preferred embodiment of the invention, the carrier vectors $s[z]_I$, $s[z]_Q$ contain carrier values being represented by 4 bits each. A two's complement representation gives a range from −8 to +7. Of course, according to the invention, any number of bits is conceivable for representing each carrier value. However, 1 to 8 bits are presently considered to be the most preferable range. For illustrating purposes, we assume that the incoming stream of data samples d(k) represent GPS C/A signals. However, according to the invention, these samples may equally well represent Galileo O/S signals, or any other type of spread spectrum/CDMA signals having a carrier Doppler component resulting from transmitter-receiver dynamics and clock imperfections.

By studying the carrier Doppler range versus the coherent integration time used (normally matched to a multiple of a code epoch or period of the transmitted PRN code) it becomes clear that during the corresponding time over which the correlation is performed, the locally generated Doppler frequency vector will contain a number of cycles. For example, a carrier Doppler shift of ±1 kHz will complete one cycle during a code epoch for GPS C/A, which is 1 millisecond long. However, a carrier with a ±2.5 kHz Doppler shift will have 2.5 Doppler cycles, and analogous, a carrier with a ±10 kHz Doppler shift will complete 10 Doppler cycles during the same interval. These multiple cycles are the reason why the remaining Doppler component must be removed before correlating the incoming data d(k) with the local code replica segments p(k). Namely, the carrier Doppler cycles include sign changes, and therefore degrade (cancel out) the correlation gain.

Due to the quantizing aspect of the carrier Doppler values used in the carrier vectors $s[k]_I$, $s[k]_Q$, a limited number of level changes occur during the integration time. In fact, the number of sequential equal values in the carrier vectors $s[k]_I$, $s[k]_Q$ between each level change is directly related to the Doppler for which compensation is desired.

For example, if we assume an equidistant angle basis for sinusoid amplitude quantizing, the 16 levels existing with 4 bit carrier Doppler values change level at every 360/16=22.5 degree phase change in the local carrier Doppler phase argument. Thus, for a 1 kHz Doppler shift, the carrier vectors $s[k]_I$, $s[k]_Q$ will contain the same amplitude value sequentially throughout $\frac{1}{16}$ of the correlation process over one code epoch. Correspondingly, for a 10 kHz Doppler shift, the carrier vectors $s[k]_I$, $s[k]_Q$ the sequential ratio is $\frac{1}{160}$.

Depending on the sampling frequency and type of RF front-end the corresponding number of samples may vary. Nevertheless, given I/Q sampling and a sampling frequency of 2 MHz, each code epoch contains 2000 complex samples (i.e. 4000 values). Hence, for a maximum Doppler shift of 10 kHz, each carrier Doppler value would be used 2000/160≈12 times sequentially before changing its value (for each of the I- and Q-vectors).

The equation (1) above may be partitioned in its real and imaginary parts, and thus be expressed as:

$$\text{Re}\{A_\tau\} = \sum_{k=0}^{L-1} (d_I[k] \cdot s_I[k]) + p_\tau[k] - \sum_{k=0}^{L-1} (d_Q[k] \cdot s_Q[k]) \cdot p_\tau[k] \quad (2a)$$

$$\text{Im}\{A_\tau\} = \sum_{k=0}^{L-1} (d_I[k] \cdot s_Q[k]) \cdot p_\tau[k] + \sum_{k=0}^{L-1} (d_Q[k] \cdot s_I[k]) \cdot p_\tau[k] \quad (2b)$$

Now, if the L valued summations are broken down into N blocks of M samples each, the expressions may be rewritten as a sum of summations. Moreover, by selecting the block size M with respect to the above-mentioned rate of the value level changes in the carrier vectors $s[k]_I$, $s[k]_Q$ expressing the Doppler shift, a very efficient reduction and reordering of processing operations can be performed. This is due to the fact that for the range of M different k indices of the carrier vectors $s[k]_I$, $s[k]_Q$ respectively, a constant carrier Doppler shift amplitude value is evaluated. Therefore, this value may be moved outside each sum, which for a first block (index=0) gives us:

$$\text{Re}\{A_{\tau,0}\} = s_{I,0} \cdot \sum_{k=0}^{M-1} d_I[k] \cdot p_\tau[k] - s_{Q,0} \cdot \sum_{k=0}^{M-1} d_Q[k] \cdot p_\tau[k] \quad (3a)$$

$$\text{Im}\{A_{\tau,0}\} = s_{Q,0} \cdot \sum_{k=0}^{M-1} d_I[k] \cdot p_\tau[k] + s_{I,0} \cdot \sum_{k=0}^{M-1} d_Q[k] \cdot p_\tau[k] \quad (3b)$$

It should be noted that the exact same sums of products are present in both the real (i.e. in-phase) and imaginary (i.e. quadrature-phase) expressions (3a) and (3b) above. Therefore, these sums only need to be computed once. Naturally, the immediate gain here is saving multiplications, since now the carrier Doppler shift compensation is performed after the actual local code replica correlation procedure. This does not introduce any correlation loss, since the result is identical in both cases due to the linear property of the modified order and operations involved.

A more processing efficient equation may now be expressed as:

$$A_\tau = \sum_{m=0}^{N-1} A_\tau[m]$$

$$= \sum_{m=0}^{N-1} \left[ \left( \sum_{k=m \cdot M}^{(m+1) \cdot M - 1} d_I[k] \cdot p_\tau[k] + j \cdot \sum_{k=m \cdot M}^{(m+1) \cdot M - 1} d_Q[k] \cdot p_\tau[k] \right) \cdot (s_I[m] + j \cdot s_Q[m]) \right]$$

If, based on the above equation, a carrier Doppler shift may be compensated for with respect to three replica delays: early $A_{E,I}, A_{E,Q}$, prompt $A_{P,I}, A_{P,Q}$ and late $A_{L,I}, A_{L,Q}$, by means of the following pseudo implementation:

```
for (m = 0:N-1)
{
    for(k=m·M:(m+1)·M-1)
    {
        c_E,I=c_E,I+d_I[k]·p_E[k]
        c_E,Q=c_E,Q+d_Q[k]·p_E[k
        c_P,I=c_P,I+d_I[k]·p_P[k]
        c_P,Q=c_P,Q+d_Q[k]·p_P[k]
        c_L,I=c_L,I+d_I[k]·p_L[k]
        c_L,Q=c_L,Q+d_Q[k]·p_L[k]
    }
    A_E,I=A_E,I+(C_E,I·s_I[m]-c_E,Q·s_Q[m])
    A_E,Q=A_E,Q+(C_E,I·s_Q[m]+C_E,Q·s_I[m])
    A_P,I=A_P,I+(c_P,I·s_I[m]-c_P,Q·s_Q[m])
    A_P,Q=A_P,Q+(c_P,I·s_Q[m]+c_P,Q·s_I[m])
    A_L,I=A_L,I+(c_L,I·s_I[m]-c_L,Q·s_Q[m])
    A_L,Q=A_L,Q+(c_L,I·s_Q[m]+c_L,Q·s_I[m])
}
```

Hence, in addition to the unavoidable load and store operations, to process a single data sample in the stream of samples d(k), only 6 multiplications and 6 additions are required. Each block of M samples shares the complex rotation of the carrier Doppler and global accumulation, so that the additional instructions for each sample becomes (12 multiplications+12 additions)/M. Based on the previous discussion of maximum 10 kHz Doppler shift and L equal to 2000 complex samples, a block size M of 12 is sufficient, and thus only infers 1 extra multiplication and additions for each sample. For large M values (or if multiple blocks of M are used for the inner loop), the added processing cost for the outer loop becomes insignificant. Therefore, the pure computational savings with this approach in a LAU implementation is quite significant.

A major benefit, however, is that the multiplications effected to compensate for the carrier Doppler shift need not be packed operations. Namely, the carrier Doppler rotation uses the block M intermediate correlation products as operands, and thus both LAU arithmetic and multiple bits may be used for the actual carrier values (i.e. s[m] in the expressions above).

Furthermore, it should be noted that the inner loop may be implemented with packed data representation and SIMD/XOR operations. The throughput becomes almost linear versus the number of samples that can be processed in parallel, and thus also linear versus the number of bits used for the sampled data representation. This is a highly desirable effect, since thereby no additional performance degradation occurs when more than single bit operands are used.

The above-described processing strategy will now be illustrated by reference to FIG. 5. We assume that an incoming stream of data samples d(k) is complex-valued, and thus expresses both an in-phase component $d(k)_I$ and a quadrature-phase component $d(k)_Q$ of at least one downconverted digitized spread spectrum source signal. NM of the data samples d(k) are divided into a first number N of data blocks, where each data block contains a second number M samples. Thus, a first data block of the data stream representing the in-phase component $d(k)_I$ contains sample values $d_{01}$ to $d_{(M-1)I}$, a second data block in this data stream contains sample values $d_{MI}$ to $d_{(2M-1)I}$, and so on up to an N:th data block containing sample values $d_{(N-1)MI}$ to $d_{(NM-1)I}$. Analogous, the data blocks of the data stream representing the quadrature-phase component $d(k)_Q$ contains sample values $d_{0Q}$ to $d_{(M-1)Q}$; $d_{MQ}$ to $d_{(2M-1)Q}$, up to $d_{(N-1)MQ}$ to $d_{(NM-1)Q}$ respectively. The second number M representing the block size is an integer larger than or equal to two.

Each of the data blocks is correlated with a respective local code replica segment, i.e. the data samples $d_{0I}$ to $d({_{M-1})I}$ in the first in-phase data block are correlated with values of a first local code replica segment containing values $p_0$ to $p_{(M-1)}$, the data samples $d_{MI}$ to d(2M−1)I in the second in-phase data block are correlated with values of a second local code replica segment containing values $p_M$ to $P_{(2M-1)}$, and so on up to the N:th in-phase data block. Correspondingly, the data samples doo to $d_{(M-1)Q}$ in the first quadrature-phase data block are correlated with values of the first local code replica segment containing values $p_0$ to $p_{(M-1)}$, and so on up to the N:th quadrature-phase data block containing data samples $d_{(N-1)MQ}$ to $d_{(NM-1)Q}$ being correlated with the N:th local code replica segment containing values $p_{(N-1)M}$ to $p_{NM-1}$. The local code replica segments are here collectively denoted by means of two identical vectors p(k).

The correlations between the result in a first number N of intermediate accumulation results $\Sigma 0_I, \Sigma_{1I}, \ldots, \Sigma_{(N-1)I}$ for the in-phase and a first number N of intermediate accumulation results $\Sigma 0_Q, \Sigma 1_Q, \ldots, \Sigma_{(N-1)Q}$ for the quadrature-phase, which are collectively referred to as $\Sigma_I$ and $\Sigma_Q$ respectively.

Then, in order to produce a target number Z (Z≤N) of discrete carrier value levels, a number of consecutive results of the intermediate accumulation results $\Sigma_I$, $I_Q$, are combined into a number of aggregated accumulation results $c_{1I}$, $c_{2I}, \ldots, c_{zI}$ and $c_{1Q}, c_{2Q}, \ldots, c_{ZQ}$, collectively referred to as $c_I$ and $c_Q$ respectively.

Finally, the aggregated accumulation results $c_I$ and $c_Q$ are correlated with a respective carrier vector $s[z]_I$ and $s[z]_Q$. Each of the carrier vectors $s[z]_I$ and $s[z]_Q$ contains the target number Z of carrier values, i.e. $s_{1I}, s_{2I}, s_{3I}, \ldots, s_{ZI}$ and $s_{1Q}$, $s_{2Q}, s_{3Q}, \ldots, s_{zQ}$ respectively. This correlation produces a decoded signal value $A_\tau$ having an in-phase representation $A\tau$, and a quadrature-phase representation $A_{\tau Q}$. The decoded signal value $A_\tau$ is now compensated for a Doppler shift relative to a down-converting frequency for the least one spread spectrum source signal, which is expressed by the carrier vectors $s[z]_I$ and $s[z]_Q$.

According to a preferred embodiment of the invention, the above-mentioned carrier values $S_{1I}$ to $s_{zI}$; $S_{1Q}$ to $s_{zQ}$ of the carrier vectors $s[z]_I$ and $s[z]_Q$ are pre-generated. Moreover, it is preferable if the carrier vectors $s[z]_I$ and $s[z]_Q$ are stored in the form of a compressed vector table.

We will now refer to FIGS. 6a to 6e in order to explain how such a compressed vector table may be generated according to one embodiment of the invention.

Figure 6:
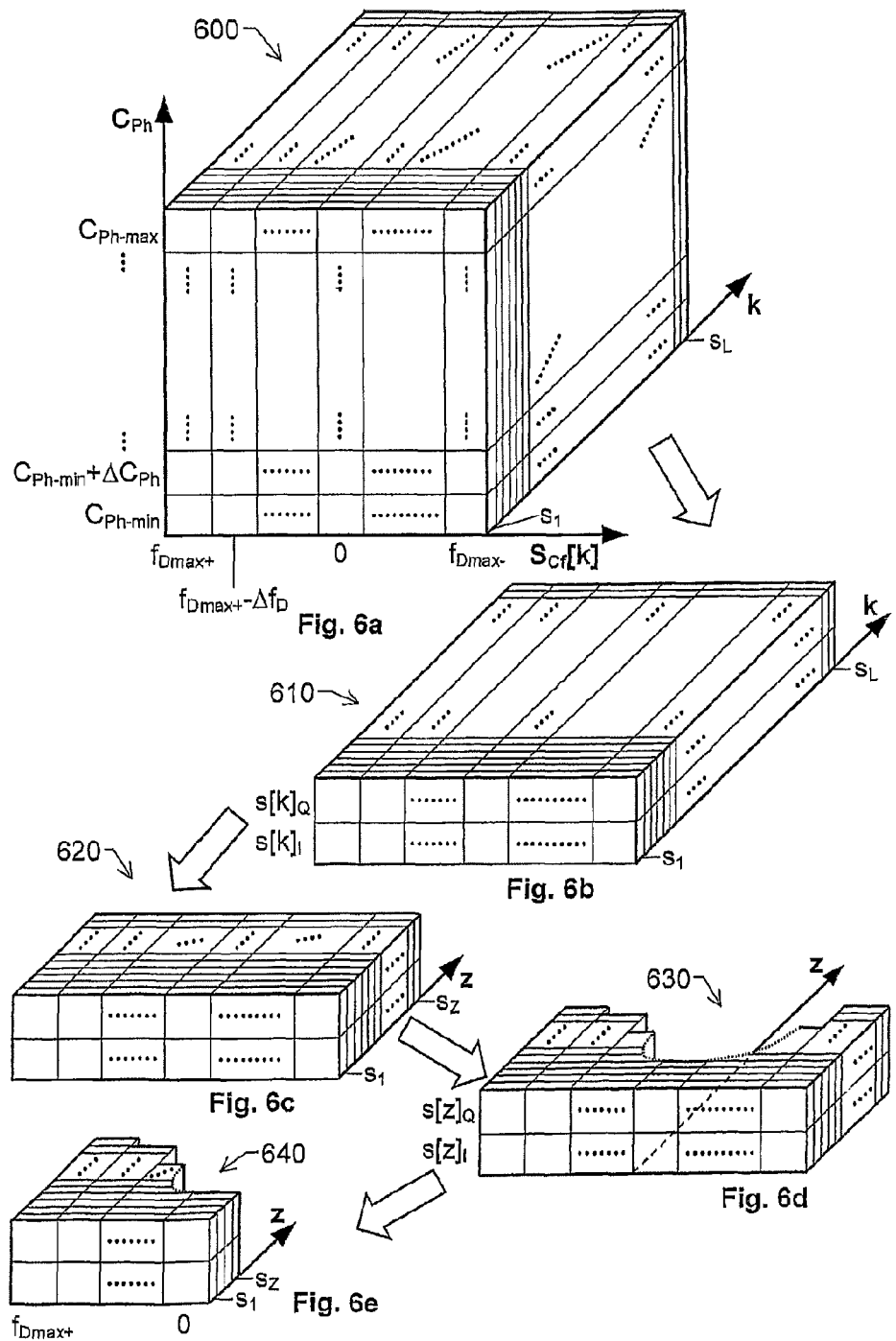

FIG. 6a shows an initial uncompressed vector table 600 containing carrier vectors $s_{Cf}[k]$ expressing carrier Doppler shifts $C_f$ from $f_{Dmax+}$ to $f_{Dmax-}$ which each contains carrier values ranging from $s_1$ to $S_L$ (i.e. L elements per vector). For each carrier vector $s_{Cf}[k]$, the table 600 also indicates initial phase shifts $C_{ph}$ from $C_{ph-min}$ to $C_{ph-max}$. The Doppler shifts Cf are incremented in $\Delta f_D$-steps and the initial phase shifts $C_{ph}$ are incremented in $\Delta C_{ph}$ steps. For any acceptable sampling frequency and resolution the table 600 thereby represents a significant amount of data.

A first compression of the table 600 is shown the form of a table 610 in FIG. 6b, wherein only two initial phase shifts $C_{ph}=s[k]_I$ (in-phase) and $C_{ph}=s[k]_Q$ (quadrature-phase) are represented. Namely, based on these two mutually orthogonal phase shifts, all intermediate phase positions can be extrapolated by performing a complex rotation on the accumulator result $A_\tau$ according to:

$$A_\tau = \sum_{k=0}^{L-1} [(d_I[k] + j \cdot d_Q[k]) \cdot (s_I[k] + j \cdot s_Q[k])] \cdot p_\tau[k]$$

and $$s_I[k] + j \cdot s_Q[k] = \cos(2\pi f_D \cdot T_S k + \varphi) + j \cdot \sin(2\pi f_D \cdot T_S k + \varphi)$$
$$= e^{j(2\pi f_D \cdot T_S k + \varphi)}$$

Therefore $$A_\tau = \sum_{k=0}^{L-1} [(d_I[k] + j \cdot d_Q[k]) \cdot e^{j(2\pi f_D \cdot T_S k + \varphi)}] \cdot p_\tau[k]$$
$$= e^{j\varphi} \cdot \sum_{k=0}^{L-1} [(d_I[k] + j \cdot d_Q[k]) \cdot e^{j(2\pi f_D \cdot T_S k)}] \cdot p_\tau[k]$$

Another compression step is illustrated in FIG. 6c, wherein it is recognized that a maximum Doppler shift necessary to compensate for is represented a number Z being lower than L (i.e. the above-mentioned target number Z). This gives us a carrier vector table 620 having a shortened vector length.

The compressed carrier vector table 620 is especially advantageous in connection with an I/Q data representation, where the stream of data samples only includes carrier Doppler shift (and not any intermediate frequency plus a Doppler shift).

Then, another benefit attained by utilizing the carrier amplitude quantizing effect is that the carrier vectors $s[z]_I$ and $s[z]_Q$ can be run-length encoded (RLE) with respect to the rate of level change in the carrier vector. RLE is a simple encoding scheme based on sequential repetition. In fact, RLE is also one of the fastest compression/decompression algorithms. FIG. 6d shows a carrier vector table 630, wherein the carrier vectors $s[z]_I$ and $s[z]_Q$ are RLE:ed.

As can be seen in the FIG. 6d, the carrier vectors expressing the lowest Doppler shift (i.e. around $C_f=0$) are most compressed, and thus cause the lowest processing loads. Namely, the number of memory loads and processing instructions required for these carrier Doppler shifts will be the lowest. For example, a carrier vector based on Doppler shift of 10 kHz would require at most L/M values and Doppler rotation operations, while a carrier vector based on 1 kHz would only require L/(10M).

An important advantage of the invention is that by matching the RLE with multiples of M block samples, no overhead is generated. Therefore, use of compressed carrier vector tables is enabled without having to trade memory usage against performance.

Finally, since the carrier vector table 630 is symmetric around the Doppler shift $C_f=0$, only one side, e.g. the positive carrier Doppler shifts, need to be represented in the table. FIG. 6e shows such a single-sided carrier vector table 640. This simplification may also be mathematically explained by means of the well-known relationships:

$\cos(-\alpha)=\cos(-\alpha)$, and $\sin(-\alpha)=-\sin(\alpha)$ or, alternatively $e^{j\alpha}=\cos(\alpha)+j\sin(\alpha)$, and $e^{-j\alpha}=\cos(\alpha)-j\sin(\alpha)$.

Figure 7:
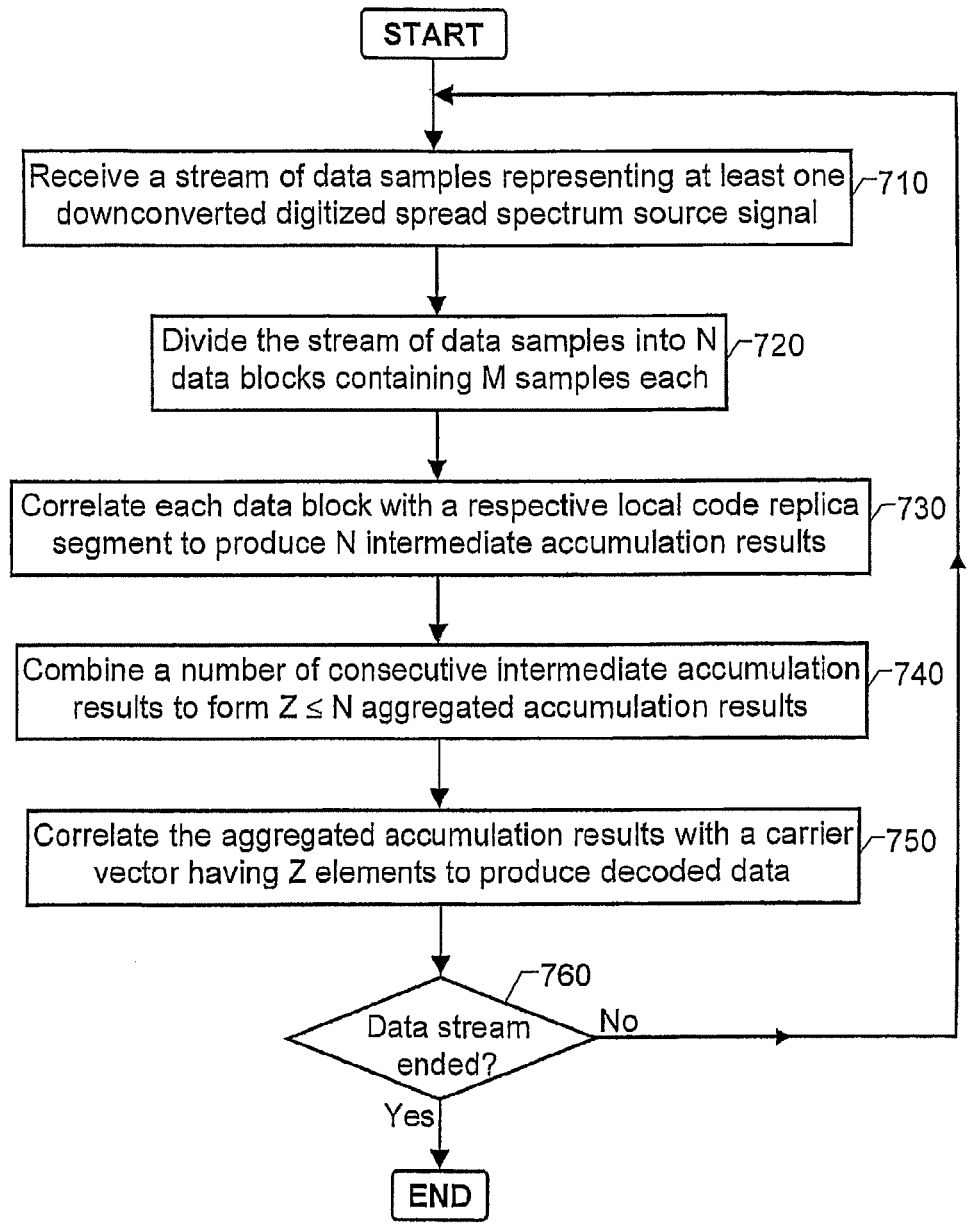
FIG. 7 illustrates, by means of a flow diagram, the general method of producing a decoded signal from a stream of data samples according to the invention.

In order to sum, up, the general method of processing spread spectrum signals according to the invention will now be described with reference to a flow diagram in FIG. 7.

A step 710 receives an incoming stream of data samples that representing at least one downconverted digitized spread spectrum source signal. A subsequent step, 720 divides the received data samples into N data block, which each contains M data samples. M is here an integer larger than or equal to two. A step 730 then correlates each of the data, blocks with a respective local code replica segment to produce N intermediate accumulation results.

Thereafter, depending on a relationship between N and a target number Z, representing, how many different amplitude values that are included in a relevant Doppler shift compensation carrier vector, a step 740 combines a number of consecutive results of the intermediate accumulation results into a number of aggregated accumulation results being equal to the target number Z.

After that, a step 750 correlates the aggregated accumulation results with the relevant carrier vector to produce a decoded piece of data, which has been compensated for a Doppler shift relative to a downconverting frequency for the least one spread spectrum source signal expressed by said relevant carrier vector.

Finally, a step 760 checks whether the data stream has ended, and if so, the procedure also ends. Otherwise, the procedure loops back to the step 710 again.

The process steps, as well as any sub-sequence of steps, described with reference to the FIG. 7 above may be controlled by means of a programmed computer apparatus, such as a microprocessor of a mobile phone, a PDA or an automotive navigation unit. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The carrier may be any entity or device capable of carrying the program. For example, the carrier may comprise a storage medium, such as a ROM (Read Only Memory), for example a CD (Compact Disc) or a semiconductor ROM, or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

A software correlator for producing a decoded signal on the basis of an incoming stream of data samples representing at least one downconverted digitized spread spectrum source signal, characterized in that the correlator comprises: a partitioning module adapted to divide a number of the received data samples into a first number of data blocks, each data block containing a second number of samples, the second number being an integer larger than or equal to two; a first correlation module adapted to correlate each of the data blocks with a respective local code replica segment to produce a first number of intermediate accumulation results; an aggregation module is adapted to combine a number of consecutive results of the intermediate accumulation results into a target number of aggregated accumulation results, the target number expressing a number of discrete carrier values in a carrier vector that represents a Doppler shift of the at least one spread spectrum source signal relative to a downconverting frequency for the at least one spread spectrum source signal for which the decoded signal is to be compensated, the target number being smaller than or equal to the first number; and a second correlation module adapted to correlate the aggregated accumulation results with the carrier vector to produce the decoded signal, which is compensated for the Doppler shift relative to the downconverting frequency.

The software correlator includes a code storage means that stores the local code replicas constituting the basis for the local code replica segments, the first correlation module being adapted to receive the local code replica segments from the storage means.

The software correlator is associated with a vector storage means that stores a compressed vector table including a plurality of pre-generated digitized carrier vectors, where each carrier vector contains a set of carrier values, and the second correlation module is adapted to receive the carrier values from the storage means.

Each of the pre-generated carrier vectors in the vector storage means is a complex valued vector that expresses in-phase and quadrature-phase carrier values respectively.

The vectors in the vector storage means are run-length encoded and the correlator is adapted to handle this type of compressed vectors by determining the applicable carrier values based on a run-length decoding algorithm.

Each of the data blocks is expressed as a first type of packed operand, each of the local code replica segments is expressed as a second type of packed operand and the first correlation module is adapted to multiply the data blocks with the local code replica segments by executing binary logical instructions in respect of the first and second types of operands.

The first correlation module is adapted to perform at least one summation operation in respect of at least one multiplication result obtained by means of the binary logical instructions based on at least one summation look-up table.

Each of the aggregated accumulation results is a first type of non-packed operand and each of the carrier values is a second type of non-packed operand, and the second correlation module is adapted to multiply the aggregated accumulation results with the carrier values by LAU operations in respect of the first and second types of non-packed operands.

A spread spectrum receiver comprising: a data interface unit adapted to receive spread spectrum source signals, in response thereto produce a stream of data samples; and a digital processing unit adapted to receive the stream of data samples and in response thereto produce a decoded signal, the digital processing unit comprising the software correlator.

The data interface unit includes a buffer unit adapted to buffer the data samples in the stream of data samples; and deliver a formatted stream of data samples to the digital processing unit, the formatted stream of data samples being adapted to a data format suitable for the digital processing unit.

The data interface unit includes a downconverting section adapted to receive the spread spectrum source signals, and in response thereto produce a pair of frequency downconverted signals representing in-phase data and quadrature-phase data respectively and a digitizing section adapted to receive the pair of frequency downconverted signals, and in response thereto produce the stream of data samples.

The data interface unit comprises a primary downconverting section adapted to receive the at least one spread spectrum source signal, and in response thereto produce a downconverted signal; a digitizing section adapted to receive the frequency down-converted signal, and in response thereto produce a primary stream of data samples; and a secondary downconverting section adapted to receive the primary stream of data samples, digitally multiply the data samples of this stream of with an in-phase and a quadrature-phase carrier wave respectively, and filter and resample a result thereof to produce the stream of data samples.

A method of producing a decoded signal, the method comprising receiving an incoming stream of data samples representing at least one downconverted digitized spread spectrum source signal, characterized by the successive steps of: dividing a number of the received data samples are into a first number of data blocks, each data block containing a second number of samples, the second number being an integer larger than or equal to two; correlating each of the data blocks with a respective local code replica segment to produce a first number of intermediate accumulation results, a target number of discrete carrier value levels being smaller than or equal to the first number, and depending on the relationship between the first number and the target number: the method involving combining a number of consecutive results of the intermediate accumulation results into a number of aggregated accumulation results that is equal to the target number; and correlating the aggregated accumulation results with a carrier vector containing the target number of carrier values to produce the decoded signal value being compensated for a Doppler shift relative to a downconverting frequency for the least one spread spectrum source signal, the Doppler shift being expressed by the carrier vector.

Each of the carrier values is pregenerated, the method comprising retrieving the carrier values from a carrier vector of a compressed vector table.

The compressed vector table comprises a number of complex valued carrier vectors, each vector including a set of carrier values representing a particular Doppler shift of the incoming stream of data samples relative to the downconverting frequency.

The vectors in the compressed vector table are run-length encoded, and the method comprises determining the carrier values by means of a run-length decoding algorithm.

Each of the data blocks is expressed as a first type of packed operand, each of the local code replica segments is expressed as a second type of packed operand and the multiplying of the data blocks with the local code replica segments involves execution of binary logical instructions in respect of the first and second types of operands.

The method comprises performing at least one summation operation in respect of at least one multiplication result obtained by means of the binary logical instructions, the summation operation being based on at least one summation look-up table.

Each of the aggregated accumulation results is a first type of non-packed operand and each of the carrier values is a second type of non-packed operand, and correlating aggregated accumulation results with the carrier values involves execution of LAU operations in respect of the first and second types of non-packed operands.

The target number of discrete carrier value levels represented by the carrier values depending on the Doppler shift expressed by the carrier vector such that a relatively low Doppler shift is associated with a comparatively low target number, and a high Doppler shift is associated with a comparatively high target number.

A computer program directly loadable into the internal memory of a computer, comprising software for performing the above proposed method when the program is run on a computer.

A computer readable medium, having a program recorded thereon, where the program is to make a computer perform the proposed method.

The invention claimed is:

1. A spread spectrum signal receiver digital processing unit, the digital processing unit being adapted to receive an incoming stream of data samples and in response thereto produce a decoded signal, the digital processing unit comprising:
   a correlation module adapted to correlate data blocks formed from the incoming stream of data samples with a local code replica segment to produce a first number of intermediate accumulation results;
   an aggregation module adapted to receive the first number of intermediate accumulation results and to combine the first number of consecutive ones of said intermediate accumulation results to form a target number of aggregated accumulation results, said target number being less than or equal to the first number, wherein the aggregation module is adapted to form the target number of aggregated accumulation results in dependence on a Doppler shift expressed by a carrier vector; and
   a second correlation module adapted to correlate the aggregated accumulation results with the carrier vector to produce a decoded signal that is compensated for the Doppler shift.

2. A digital processing unit as claimed in claim 1, wherein the aggregation module is adapted to form the target number of aggregated accumulation results such that a relatively low Doppler shift is associated with a comparatively low target number and a relatively high Doppler shift is associated with a relatively high target number.

3. A digital processing unit as claimed in claim 1, wherein the aggregation module is arranged to form the target number of aggregated accumulation results to be equal to a number of discrete carrier values in the carrier vector.

4. A digital processing unit as claimed in claim 1, wherein the digital processing unit further comprises a partitioning module adapted to receive a downconverted digitised spread spectrum source signal and to divide that signal into a number of data blocks equal to the first number, each data block containing a second number of samples, the second number being an integer larger than or equal to two, and to output the first number of data blocks to the first correlation module.

5. A digital processing unit as claimed in claim 4, wherein the partitioning module is adapted to form the data blocks to be expressed as packed operands, and the first correlation module is adapted to multiply the data blocks with local code replica segments that are also expressed as packed operands by executing binary logical instructions.

6. A digital processing unit as claimed in claim 1, wherein the first correlation module is adapted to perform a summation operation in respect of at least one multiplication result obtained by means of the binary logical instructions by using a summation look-up table.

7. A digital processing unit as claimed in claim 1, wherein the first correlation module is adapted to generate the accumulation results to be expressed as non-packed operands and/or the aggregation unit is adapted to generate the aggregated accumulation results to be expressed as non-packed operands.

8. A digital processing unit as claimed in claim 1, wherein the second correlation module is adapted to correlate the aggregated accumulation results with carrier values that are expressed as non-packed operands by executing least-addressable unit operations.

9. A digital processing unit as claimed in claim 1, wherein the second correlation module is adapted to correlate the aggregated accumulation results with carrier values that are expressed in a multiple-bit format.

10. A digital processing unit as claimed in claim 1, wherein the digital processing unit is adapted to store a compressed vector table comprising a plurality of pre-generated carrier vectors.

11. A digital processing unit as claimed in claim 10, wherein the plurality of pre-generated carrier vectors are run-length encoded, the digital processing unit being capable of generating a carrier vector comprising a number of discrete carrier values from said run-length encoded vectors by means of a run-length decoding algorithm.

12. A method for receiving an incoming stream of data samples representing a spread spectrum signal and in response thereto producing a decoded signal, comprising:
    correlating data blocks formed from the incoming stream of data samples with a local code replica segment to produce a first number of intermediate accumulation results;
    combining the first number of consecutive ones of said intermediate accumulation results to form a target number of aggregated accumulation results for outputting to a second correlation module, said target number being less than or equal to the first number, wherein the target number of aggregated accumulation results is formed in dependence on a Doppler shift expressed by a carrier vector; and
    correlating the aggregated accumulation results with the carrier vector to produce a decoded signal that is compensated for the Doppler shift.

13. A spread spectrum signal receiver aggregation module comprising a processor, the aggregation module being adapted to receive a first number of accumulation results from a first correlation module, said accumulation results representing the correlation between an incoming stream of data samples and a local code replica segment, and to combine the first number of consecutive ones of said accumulation results to form a target number of aggregated accumulation results for outputting to a second correlation module, said target number being less than or equal to the first number, in dependence on a Doppler shift expressed by a carrier vector, the aggregation module thereby being capable of adapting the accumulation results from the first correlation module to a number of discrete carrier values in a carrier vector with which the aggregated accumulation results are to be correlated by the second correlation module to produce a decoded signal that is compensated for the Doppler shift.

* * * * *